Figure 3:
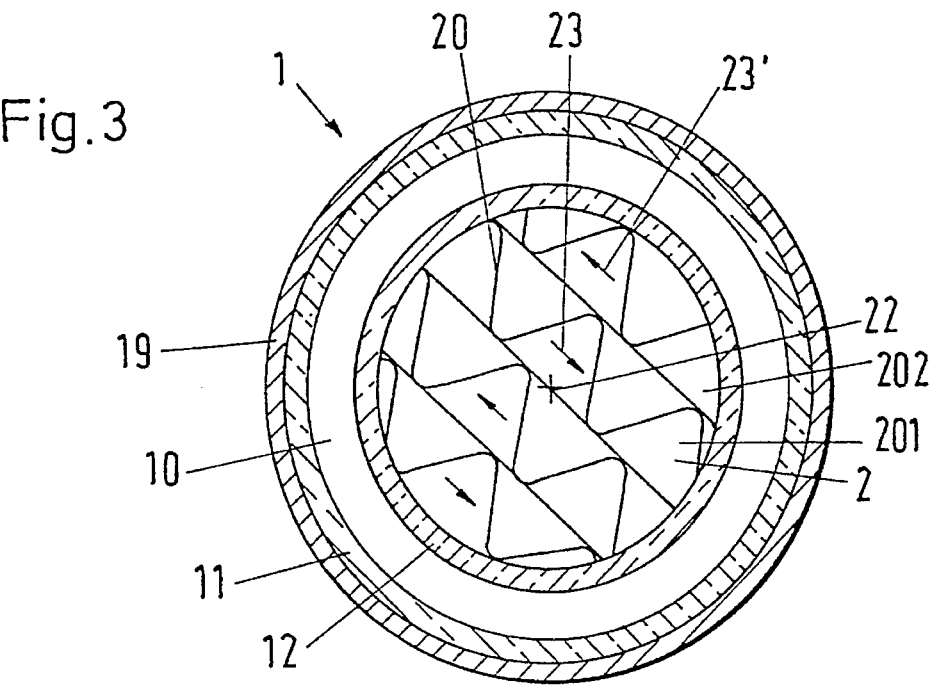

United States Patent [19]
Oppenländer et al.

[11] Patent Number: 5,614,723
[45] Date of Patent: Mar. 25, 1997

[54] APPARATUS FOR TREATING FLUIDS WITH ULTRAVIOLET RADIATION

[75] Inventors: Thomas Oppenländer, Schwenningen, Germany; Peter Mathys, Neuhausen; Gottlieb Schneider, Seuzach, both of Switzerland

[73] Assignee: Sulzer Chemtech AG, Switzerland

[21] Appl. No.: 512,241

[22] Filed: Aug. 7, 1995

[30] Foreign Application Priority Data

Aug. 15, 1994 [EP] European Pat. Off. ............. 94810469

[51] Int. Cl.[6] ................................................. G01N 21/00
[52] U.S. Cl. .......................... 250/435; 422/24; 250/437
[58] Field of Search .......................... 250/432 R, 435, 250/436, 437; 422/24

[56] References Cited

U.S. PATENT DOCUMENTS 3,923,288 12/1975 King ............................................ 259/4
4,034,965 7/1977 King ...................................... 259/4 AB
4,892,712 1/1990 Robertson et al. ...................... 250/436
4,913,827 4/1990 Nebel ......................................... 422/24
5,194,740 3/1993 Kogelschatz et al. .................. 250/436
5,227,637 7/1993 Herold et al. ............................ 250/438

FOREIGN PATENT DOCUMENTS

0508046A1 10/1992 European Pat. Off. .

*Primary Examiner*—Bruce C. Anderson
*Attorney, Agent, or Firm*—Townsend and Townsend and Crew

[57] ABSTRACT

The apparatus for treating fluids with ultraviolet radiation comprises at least one elongate cylindrical excimer radiator and at least one chamber (2) provided as a through-flow and treatment section for the fluid. The or each radiator has a discharge volume (10) and two electrodes (19, 20) with one of the electrodes (20) being arranged in the chamber (2) provided for the fluid. According to the invention, the electrode (20) in the fluid chamber (2) is formed as a static mixer for the fluid (21) as a so-called static mixer electrode.

13 Claims, 2 Drawing Sheets

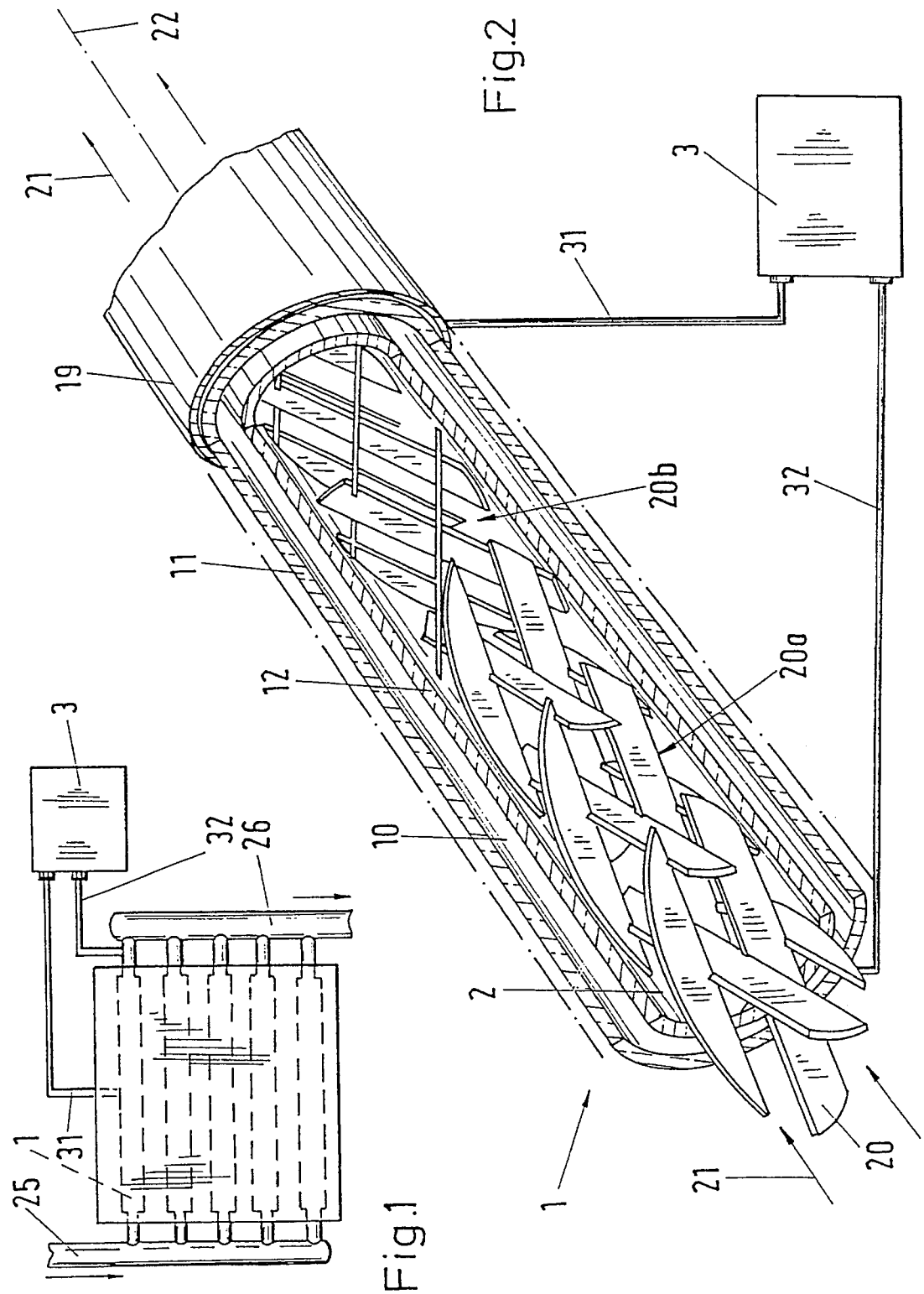

APPARATUS FOR TREATING FLUIDS WITH ULTRAVIOLET RADIATION

The invention relates to an apparatus for treating fluids with ultraviolet radiation in accordance with the preamble of claim 1. The invention further relates to plants having apparatuses of this kind as well as to uses of apparatuses of this kind.

A radiator is known from EP-B-0 254 111 which produces ultraviolet radiation by means of excimers. In particular, an excimer radiator is known which comprises two coaxial, cylindrical quartz tubes which are connected to one another in a gas-tight manner. The ring space between the tubes forms the discharge volume in which an excimer gas is enclosed. Electrodes are situated outside the discharge volume and are connected to a radio frequency generator (RF-generator) As a result of a high frequency high voltage, the electrodes induce plasma discharges in the discharge volume via which excimer molecules are formed. The excimer molecules decay shortly after their creation whereby, in each case, an ultraviolet photon is emitted. Excimer gases are nobel gases (xenon, krypton and argon), halogens (iodine, bromine, chlorin and fluorin) as well as mixtures of nobel gases and halogens. Excimer molecules are electronically excited molecular complexes (e.g. $Xe_2^*$ or $XeCl^*$) which can be formed in coronas (silent electronic discharges). Upon the emission of a photon, the atoms separate from one another. The excimer radiators are characterized by their narrow-band emission spectra (incoherent, "quasi-monochromatic" radiation). Depending on the particular excimer gas the emission is at different wavelengths in the ultraviolet region of the electromagnetic spectrum. Infrared radiation is not produced. The excimer radiator can be driven continuously or pulsed (pulse duration for example 0.1s).

In a particular embodiment of the excimer radiator, the inner tube acts as a through-flow section for the fluid (gas or liquid) to be treated. The inner electrode, which is in contact with the fluid, is formed as a coil; the outer electrode envelops the double-walled quartz tube and functions as a reflector for the ultraviolet radiation whereby an inner-centered radiation geometry results. With a through-flow excimer lamp of this kind, the following problem has to be taken account of:

The ultraviolet photons are absorbed as a rule in a narrow edge zone of the fluid chamber, in particular for liquid treatment. Due to the small penetration depth of the radiation, a good intermixing of the fluid must be provided for in order to accelerate the efficiency of the photoreaction and in order to prevent polymerisation reactions at the interface between the fluid and the inner walls of the radiator. When treating a liquid with the known apparatus, this is satisfied by guiding in of gases. Another possibility is to provide for a turbulent flow with high through-flow rates.

It is the object of the invention to further develop the known through-flow excimer lamp such that the radiation treatment can be performed with good efficiency, with a laminar flow of the fluid and without guiding in of gases (for the treatment of a liquid). This object is satisfied in accordance with the invention by the measures given in the characterizing part of claim 1.

The independent claims 2 to 7 relate to different embodiments of the ultraviolet excimer through-flow reactor of the invention. The independent claim 8 relates to plants comprising a plurality of radiators. The subject matter of the subsequent claims 9 to 12 is various uses of the apparatus of the invention.

Figure 4:
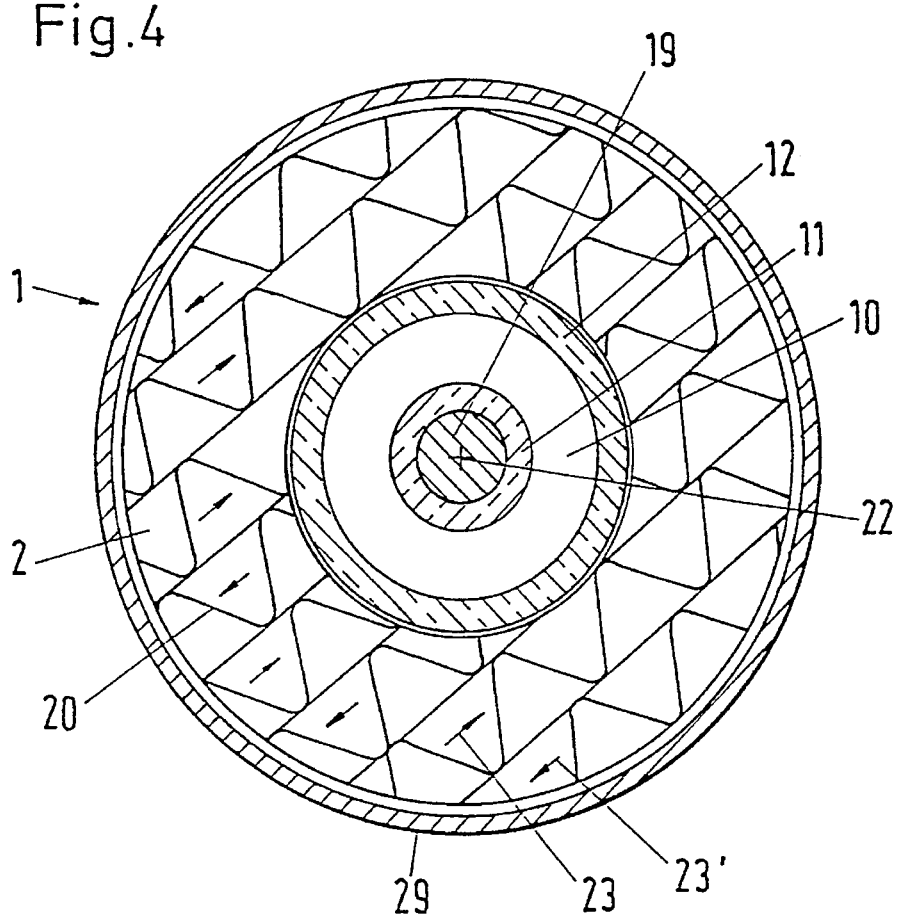

The invention is described in the following in more detail for the purpose of example only with, the aid of Figures which show:

FIG. 1 a plant comprising a plurality of through-flow excimer lamps,

FIG. 2 cut-away perspective view of a radiator of the invention,

FIG. 3 cross-section through the radiator of the invention for a first embodiment and FIG. 4 cross-section for a second embodiment.

A plant of modular construction is shown in FIG. 1 in which the modules are five through-flow excimer lamps 1 arranged in parallel. The modules 1 are connected to a distributor 25 and a collector 26. The electrodes of the excimer radiator are connected to an RF-generator 3 via lines 31 and 32. (In FIG. 1, the connections 31, 32 are only shown to one module 1.) In other plants, which are not shown, modules could also be connected together in series, wherein it can be advantageous when the excimer radiators emit at different, application specific wavelength.

The apparatus 1 of the invention in FIG. 2 shows the following features: The discharge volume 10 which is filled with an excimer gas and which is formed by the quartz tubes 11 and 12; the chamber 2 which is provided as the through-flow and treatment section for the fluid and which contains the electrode 20 which is formed as a static mixer (referred to in the following as the static mixer electrode); and the outer electrode 19 which is formed as an ultraviolet reflector. The electrode 19 is connected via the line 31 to the RF generator 3 and the static mixer electrode 20 is connected via the line 32 to the RF generator 3. The arrows 21 show the principal flow direction of the fluid. The longitudinal axis of the apparatus 1 is labelled with the reference numeral 22.

A static mixer is comprised of a series of axially arranged mixer elements. In the mixer 20 of FIG. 2 (which is for instance known from CH-PS 642 564) two mixer elements, namely 20a and 20b are visible. A mixer element of this kind has a structure formed by mutually engaging and crossing webs, with the webs forming two groups of structural elements aligned in parallel to one another.

FIG. 3 shows the cross-section through a radiator 1 of the invention which is substantially the same as the radiator of FIG. 2. The difference lies in the structure of the static mixer electrode 20: A mixer element is comprised here of layers 201 and 202 which are each formed from a folded lamella. Due to the folding, channels are formed which cross each other openly. The arrows 23 and 23' indicate the directions of the channels which enclose an angle with the direction of the axis 22.

The embodiment of FIG. 4 is an inverted form of the embodiment of FIG. 3. The electrode 19 is a rod which is arranged centrally on the axis 22 and which is enveloped or shrouded by a first quartz tube 11. Between this quartz tube 11 and a coaxial quartz tube 12 is situated the discharge volume 10. The chamber 2 for the treatment of the fluid is a ring space which coaxially surrounds the discharge volume 10. Electrodes 20 which are formed as the static mixer are situated in this chamber 2 and have a cross-channel structure as in the example of FIG. 3. Naturally, the mixer construction of FIG. 4 is also only to be understood as an example. A tube 29 forms the outer connection of the apparatus 1. Instead of the rod-shaped electrode 19, a spiral-shaped one can for example be provided.

A second discharge gap can be provided between the tube 29 and the static mixer electrode 20 (see FIG. 4) wherein, in this case, the tube 29 is formed as an electrode. In such an embodiment, the fluid is treated from the inside and from the outside. An advantage of this reactor geometry is also the possibility of a "double radiation treatment", namely in the manner that the two discharge volumes are filled with excimer gases which have different emission wavelengths.

A combination of the two embodiments shown in FIGS. 3 and 4 is also conceivable so that the fluid to be treated is exposed to the ultraviolet radiation on both sides of the discharge volume 10 and the electrodes 19 and 20 are both formed as static mixers. Since the radiation emitted by an excimer radiator has a narrow-band spectrum, the apparatus of the invention can advantageously be used for performing wavelength-selective photoreactions. In such a use, either the reactants themselves form the fluid to be treated or the reactants are mixed into a fluid which serves as the transport means. Examples for this are the wavelength selective photolysis of 7-dehydrocholesterin for the production of vitamin $D_3$. It is known that the $Br_2^*$ excimer radiator (wavelength=289 nm) is best suited for this. Furthermore, technical photochemical processes can be performed with the apparatus of the invention more efficiently (e.g. photochlorification, photobromification, photosulphochlorination).

Further applications of the apparatus of the invention relate to the water industry and the sewage industry in which polluted water is the fluid to be treated. Examples which can be named for the treatment are: a) degermination; b) breakdown of pollutants, dyes or odour.

For the treatment of fluids of small optical density (i.e. of high penetration depths of the ultraviolet radiation) a static mixer electrode is suitable which or whose surface is made of an ultraviolet reflective material. This provides via the reflection a diffuse radiation in the fluid flow additionally in the axial direction.

The static mixer electrode 20 can also be used to treat mixtures of liquids, gas bubbles and/or solid particles. As a result of the mixing action, demixing is prevented. Consequently, for example, air or oxygen bubbles can be transported with the water during the treatment of polluted water. An oxygen enrichment in the water can accelerate the breakdown of pollutants considerably. An ozone formation can also be achieved via the ultraviolet radiation.

The apparatus of the invention can also be used for sterilizing other liquids. Furthermore, for performing heterogeneous catalysed reactions, particles with catalytically active surfaces can be admixed to the fluid to be treated. Particles can also be admixed which have surfaces made of an ultraviolet reflective material.

For performing heterogeneous catalysed reactions, the surfaces of the static mixer electrodes can also be coated with a catalytically active material. For example a titanium dioxide coating can be used for the treatment of polluted water. A catalytically active material can also be contained in pocket-like intermediate spaces of the static mixer electrode, namely in the manner known from EP-B-0 396 650.

We claim:

1. Apparatus for treating fluids with ultraviolet radiation comprising an elongate cylindrical eximer radiator and a chamber (2) which is provided as a through-flow and treatment section for the fluid, with the radiator having a discharge volume (10) as well as two electrodes (19, 20) and with one of the electrodes (20) being arranged in the chamber (2) provided for the fluid, characterized in that the electrode (20) in the fluid chamber (2) is formed as a static mixer for the fluid (21) as a so-called static mixer electrode.

2. Apparatus in accordance with claim 1, characterized in that the ring space of a double-walled quartz tube (11, 12) forms the discharge volume (10) and in that the static mixer electrode (20) is arranged in the central chamber (2) of the tube (11, 12).

3. Apparatus in accordance with claim 2, characterized in that the second electrode (19) envelops the double-walled quartz tube (11, 12) and act as a reflector for the ultraviolet radiation.

4. Apparatus in accordance with claim 1, characterized in that the static mixer electrode (20) is arranged in a ring space which coaxially surrounds the discharge volume (10).

5. Apparatus in accordance with claim 1, characterized in that the static mixer electrode (20) is arranged in a ring space between two discharge volumes.

6. Apparatus in accordance with claim 1, characterized in that parts of the static mixer electrode (20) comprise catalytically active material.

7. Apparatus in accordance with claim 1, characterized in that the surfaces of the static mixer electrodes (20) comprise ultraviolet reflective material.

8. Plant comprising a plurality of apparatuses in accordance with claim 1, characterized in that the apparatuses (1) are connected together as modules, wherein the excimer radiators of the modules can have different emission wavelengths.

9. A method for treating a fluid with ultraviolet radiation comprising the step of:

flowing a fluid through a chamber (2);

mixing the fluid flowing through the chamber using a first static mixer electrode (20) within the chamber; and applying an excitation current to the first electrode and to a second electrode (19) generally coaxial with the first electrode to create ultraviolet radiation from an eximer discharge volume (10) arranged between the first and second electrodes.

10. The method according to claim 9 further comprising the step of selecting a photochemical reaction gas as at least a portion of said fluid.

11. The method according to claim 9 further comprising the steps of:

selecting said fluid from the group consisting essentially of contaminated liquids and polluted water; and selectively adding a reaction gas or oxidizing agent to said fluid prior to the flowing step.

12. The method according to claim 9 further comprising the step of admixing at least one of the following to the fluid prior to the flowing step: air, oxygen and ozone.

13. The method according to claim 9 further comprising the steps of:

selecting particles from the following group: ultraviolet reflective particles and catayltically active particles; and admixing particles to the fluid prior to the flowing step.

* * * * *